US012248331B2

(12) United States Patent
Lin et al.

(10) Patent No.: US 12,248,331 B2
(45) Date of Patent: Mar. 11, 2025

(54) LOW-DROPOUT (LDO) REGULATOR WITH A FEEDBACK CIRCUIT

(71) Applicant: Taiwan Semiconductor Manufacturing Company, Ltd., Hsinchu (TW)

(72) Inventors: Zheng-Jun Lin, Hsinchu (TW); Chung-Cheng Chou, Hsinchu (TW); Yu-Der Chih, Hsinchu (TW); Chin-I Su, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 118 days.

(21) Appl. No.: 17/877,115

(22) Filed: Jul. 29, 2022

(65) Prior Publication Data

US 2024/0036597 A1 Feb. 1, 2024
US 2025/0021120 A9 Jan. 16, 2025

Related U.S. Application Data

(63) Continuation of application No. 17/010,064, filed on Sep. 2, 2020, now Pat. No. 11,442,482.

(Continued)

(51) Int. Cl.
*G05F 1/575* (2006.01)
*G05F 1/565* (2006.01)

(52) U.S. Cl.
CPC .............. *G05F 1/575* (2013.01); *G05F 1/565* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18;

(Continued)

(56) References Cited

U.S. PATENT DOCUMENTS 6,232,753 B1 5/2001 Pasotti et al.
6,583,607 B1 6/2003 Marty et al.

(Continued)

FOREIGN PATENT DOCUMENTS

CN 1838020 A 9/2006
CN 101644936 A 2/2010

(Continued)

*Primary Examiner* — Jeffrey A Gblende
(74) *Attorney, Agent, or Firm* — Merchant & Gould P.C.

(57) ABSTRACT

A voltage regulator circuit is provided. The voltage regulator circuit includes a voltage regulator configured to provide an output voltage at an output terminal. A plurality of macros are connectable at a plurality of connection nodes of a connector connected to the output terminal of the voltage regulator. A feedback circuit having a plurality of feedback loops is connectable to the plurality of connection nodes. The feedback loop of the plurality of feedback loops, when connected to a connection node of the plurality of connection nodes, is configured to provide an instantaneous voltage of the connection node as a feedback to the voltage regulator. The voltage regulator is configured, in response to the instantaneous voltage, regulate the output voltage to maintain the instantaneous voltage of the connection node approximately equal to a reference voltage.

20 Claims, 9 Drawing Sheets

Related U.S. Application Data

(60) Provisional application No. 62/908,084, filed on Sep. 30, 2019.

(58) Field of Classification Search

CPC ... G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069

See application file for complete search history.

(56) References Cited

U.S. PATENT DOCUMENTS

| | | | | |
|---|---|---|---|---|
| 7,068,019 | B1 | 6/2006 | Chiu | |
| 7,619,402 | B1 | 11/2009 | Kwong | |
| 7,973,521 | B2 | 7/2011 | Chen et al. | |
| 8,217,635 | B2 * | 7/2012 | Nonis | H03G 1/0005 323/267 |
| 8,760,195 | B2 | 6/2014 | Kutz et al. | |
| 9,146,572 | B2 | 9/2015 | Jackum et al. | |
| 9,411,348 | B2 | 8/2016 | Iacob et al. | |
| 9,893,632 | B2 | 2/2018 | Freeman et al. | |
| 10,175,707 | B1 | 1/2019 | Wei et al. | |
| 10,296,028 | B2 | 5/2019 | Zhang et al. | |
| 10,579,084 | B2 | 3/2020 | Chen et al. | |
| 2010/0157692 | A1 | 6/2010 | Wang et al. | |
| 2012/0217938 | A1 | 8/2012 | Sagneri et al. | |
| 2013/0176009 | A1 | 7/2013 | Yang et al. | |
| 2014/0015509 | A1 | 1/2014 | Gupta et al. | |
| 2017/0052552 | A1 * | 2/2017 | Mahmoudi | G05F 1/575 |
| 2021/0096586 | A1 * | 4/2021 | Lin | H02M 3/155 |

FOREIGN PATENT DOCUMENTS

| | | | |
|---|---|---|---|
| CN | 101751976 | A | 6/2010 |
| CN | 104216454 | A | 12/2014 |
| CN | 106292516 | A | 1/2017 |
| CN | 107924206 | A | 4/2018 |
| CN | 109144157 | A | 1/2019 |
| CN | 110096086 | A | 8/2019 |
| TW | 201211716 | A | 3/2012 |
| TW | 201333659 | A | 8/2013 |
| TW | 201701101 | A | 1/2017 |
| WO | 2017/151303 | A1 | 9/2017 |

* cited by examiner

LOW-DROPOUT (LDO) REGULATOR WITH A FEEDBACK CIRCUIT

CROSS-REFERENCE TO RELATED APPLICATION

This application is a continuation of U.S. patent application Ser. No. 17/010,064 filed Sep. 2, 2020, which claims priority to U.S. Provisional Patent Application No. 62/908,084, filed Sep. 30, 2019, the disclosure of which are hereby incorporated by reference in their entirety.

BACKGROUND

Reference voltage generators, such as low-dropout (LDO) regulators, often are used in semiconductor devices. For instance, an LDO regulator is typically used to provide a well-specified and stable direct-current (DC) voltage. Generally, a LDO regulator is characterized by its low dropout voltage, which refers to a small difference between respective input voltage and output voltage. A typical application for an LDO regulator is a memory device, such as a resistive random access memory (RRAM).

In order to save area, a shared and centralized LDO is commonly adopted for multiple memory macros. However, wire resistance of a connector increases with an increase in the number of connected macros, and voltage drop becomes worse with such an increased number of macros. Such voltage drop due to wire resistance across different macros may cause near-far effect and voltage drop, resulting in reduced write performance.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. In addition, the drawings are illustrative as examples of embodiments of the invention and are not intended to be limiting.

DETAILED DESCRIPTION

Figure 1:
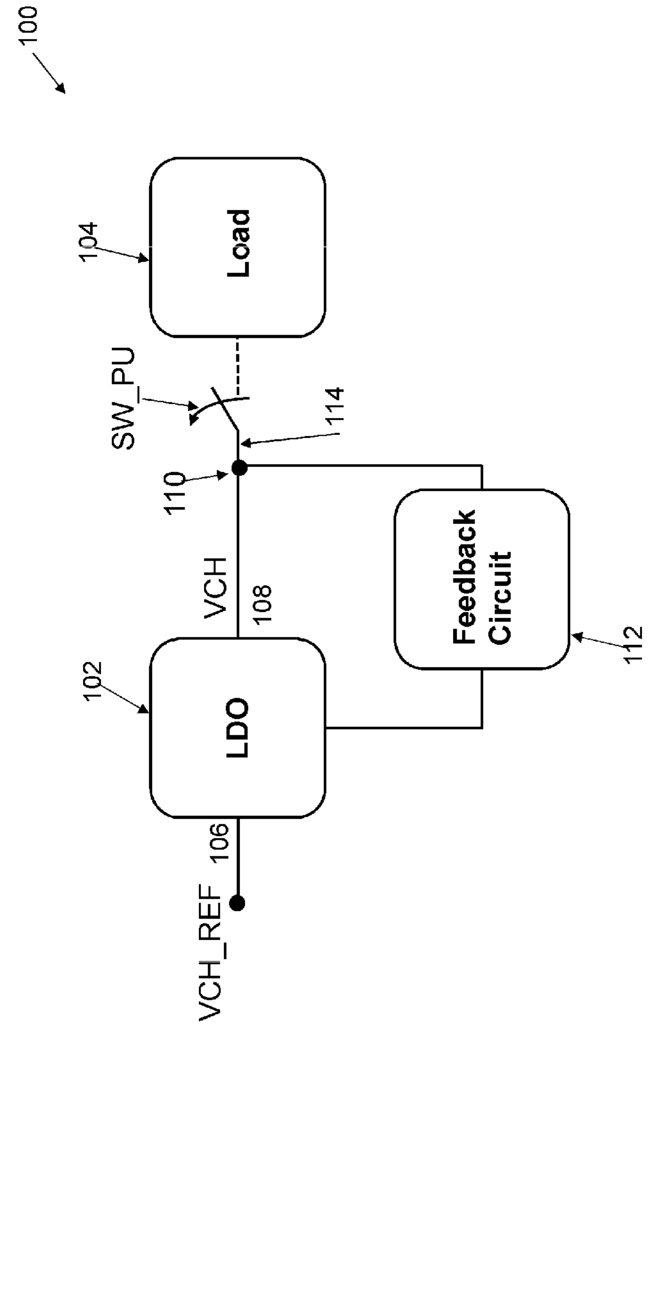
FIG. 1 is a diagram generally illustrating an example LDO voltage regulator circuit in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A low-dropout (LDO) voltage regulator provides a specified and stable direct-current (DC) output voltage (e.g., a regulated output voltage) based on an input voltage (e.g., an unregulated input voltage) with a low dropout voltage. The "dropout voltage" used herein refers to a minimum voltage across the (LDO) voltage regulator to maintain the output voltage being regulated. Even though the input voltage, provided by a power source, falls to a level very near that of the output voltage and is unregulated, the LDO voltage regulator can still produce the output voltage that is regulated and stable. Such a stable characteristic enables the LDO voltage regulator to be used in a variety of integrated circuit (IC) applications, for example, a memory device, a power IC device, etc. To save area of the IC circuits, a shared and centralized LDO is typically utilized for multiple macros of the IC circuit. However, using one centralized LDO causes different voltage levels for the different macros because of a voltage drop across a connector.

The disclosure provides a LDO voltage regulator circuit with a location-aware feedback loop to supply a stable output voltage to multiple macros while addressing voltage drop and near-far effect due to wire resistance across different macros. The LDO voltage regulator circuit described herein includes a LDO voltage regulator and a feedback circuit which dynamically monitors an instantaneous voltage level at each macro connection node and provides the instantaneous voltage to the LDO voltage regulator as a feedback response so as to avoid the above-mentioned issues while simultaneously maintaining the LDO voltage regulator's stable output voltage. In some embodiments, the feedback circuit includes a feedback path from each macro connection nodes to a comparator of the LDO voltage regulator. The comparator of the LDO voltage regulator compares the instantaneous voltage level of each micro connection nodes to a reference voltage level and adjusts an output voltage of the LDO voltage regulator in real time. The LDO voltage regulator circuit will now be described in greater detail in the following sections of the disclosure.

FIG. 1 is a diagram of a low-dropout (LDO) voltage regulator circuit 100, in accordance with various embodiments. As shown in FIG. 1, LDO voltage regulator circuit 100 includes a LDO voltage regulator 102, a load 104, and a feedback circuit 112. Load 104 is connectable to LDO voltage regulator 102 at a connection node 110 via a load switch SW_PU. Connection node 110 is located on a connector 114. That is, the load switch SW_PU is switched-on to connect load 104 to a connection node 110 of LDO voltage regulator 102. Moreover, the load switch SW_PU is switched-off to disconnect load 104 from connection node 110 of LDO voltage regulator 102. Feedback circuit 112 is connectable to connection node 110 of LDO voltage regulator 102.

LDO voltage regulator 102 includes a first input terminal 106 and an output terminal 108. Connector 114 is connected to output terminal 108. In some embodiments, LDO voltage regulator 102 is configured to receive an input voltage VCH_REF (also referred to as Vin) at first input terminal 106 and provide a stable output voltage VCH (also referred to as Vout) at output terminal 108. The input voltage VCH_REF may be provided by a power source (e.g., a battery (not shown)) that may be unregulated. The voltage level of the output voltage VCH may be lower than the voltage level of the input voltage VCH_REF by a small amount (e.g., from about 100 mV to about 1 V), which is generally referred to as LDO voltage regulator's 102 dropout voltage. As the name "low-dropout" implies, such a dropout voltage is typically selected to be substantially small.

In example embodiments, feedback circuit 112 is configured to assist in maintaining of the output voltage VCH of LDO voltage regulator 102 at a substantially stable value while various levels of load 104 are coupled to connection node 110. For example, feedback circuit 112 is configured to provide an instantaneous voltage level at connection node 110 as a feedback to LDO voltage regulator 102. LDO voltage regulator 102, based on the received instantaneous voltage level, can adjust the output voltage VCH to maintain a predetermined voltage level at connection node 110. Details of the LDO voltage regulator 102 and feedback circuit 112 are discussed in further detail below.

Figure 2:
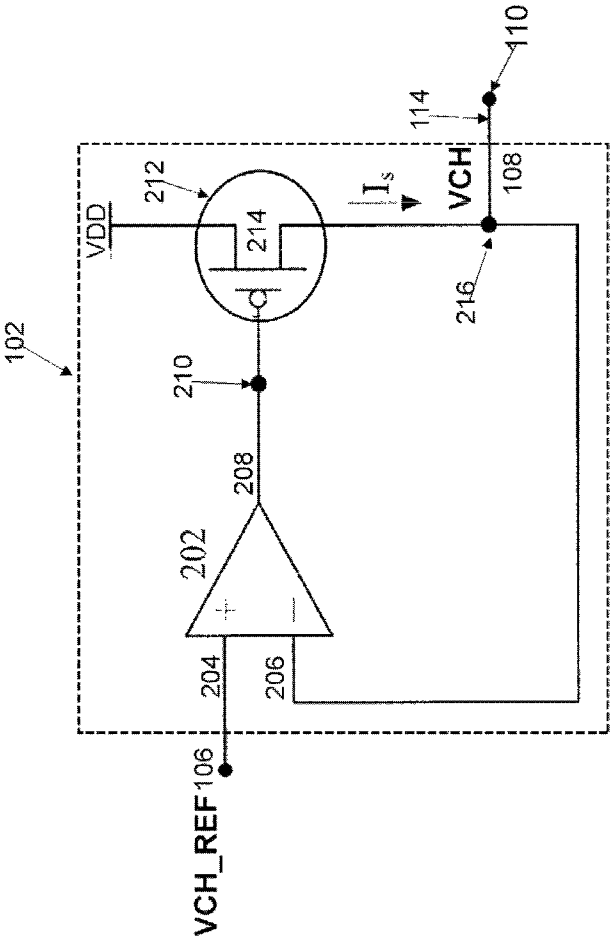
FIG. 2 is a diagram generally illustrating an example LDO voltage regulator in accordance with some embodiments.

FIG. 2 illustrates an exemplary circuit diagram of the LDO voltage regulator 102, in accordance with various embodiments. It is noted that the illustrated embodiment of FIG. 2 is merely a simplified circuit diagram provided for explanation. That is, LDO voltage regulator 102 can be implemented as any of a variety of circuit diagrams of an LDO voltage regulator to include other circuit elements and/or circuits, for example, a voltage divider, a Miller compensation circuit, one or more switches, etc.

As shown in FIG. 2, LDO voltage regulator 102 includes an amplifier 202 and a current source 212. Amplifier 202 includes a first input terminal 204 and a second input terminal 206. First input terminal 204 and second input terminal 206 are also referred to as a non-inverting input terminal and an inverting input terminal respectively. Amplifier 202 further includes an amplifier output terminal 208. Amplifier output terminal 208 is connected to a first internal node 210 of LDO voltage regulator 102. In example embodiments, amplifier 202 is an operational amplifier (also referred to as an op-amp or opamp). In some examples, amplifier 202 is also referred to as an error amplifier.

Current source 212 is connected in series with amplifier 202. For example, amplifier output terminal 208 is connected to current source 212 via first internal node 210. In example embodiments, current source 212 is formed by a transistor 214. In some embodiments, current source 212 is implemented as a p-type metal-oxide-semiconductor (PMOS) transistor 214. However, it is understood that current source 212 may be implemented as any of a variety of transistors and/or circuits. Further to the embodiment where current source 212 is implemented as PMOS transistor 214, a gate of transistor 214 is coupled amplifier output terminal 208 via first internal node 210. A source of transistor 214 is coupled to a transistor supply voltage (for example, Vdd), and a drain of transistor 214 is coupled to a second internal node 216 of LDO voltage regulator 102. Second internal node 216 is connected to output terminal 108 of LDO voltage regulator circuit 100. In example embodiment, transistor 214 is symmetric. That is, the source of transistor 214 can be coupled to second internal node 216 and the drain of transistor 208 can be coupled to the supply voltage.

As discussed above, since the illustrated embodiment of LDO voltage regulator 102 in FIG. 2 is merely a simplified example, operation of LDO voltage regulator 102 is briefly described as follows. To operate LDO voltage regulator 102, in some embodiments, a source current Is (also referred to a standby current Is) is generated by current source 212 and sinked at second internal node 216. The source current Is establishes the output voltage VCH at second internal node 216. The output voltage VCH is controlled by the input voltage VCH_REF at the non-inverting input terminal of amplifier 202. More specifically, when the voltage level of VCH is relatively high, an error voltage (i.e., the output of amplifier 202) received by the gate of transistor 214 proportionally increases. The increase in the error voltage reduces source-gate voltage (Vsg) of transistor 214 (that is, current source 212), which causes a decrease in the source current Is. As a result, the voltage level of the output voltage VCH decreases. Through an opposite mechanism, a relatively low output voltage level pulls down the error voltage, then increases the source current Is, and in turn increases the voltage level of the output voltage VCH. In other words, LDO voltage regulator 102 is configured to control the voltage level of the output voltage VCH to be at a substantially stable value, and such a stable value is controlled to be close to the voltage level of the input voltage VCH_REF.

Figure 3:
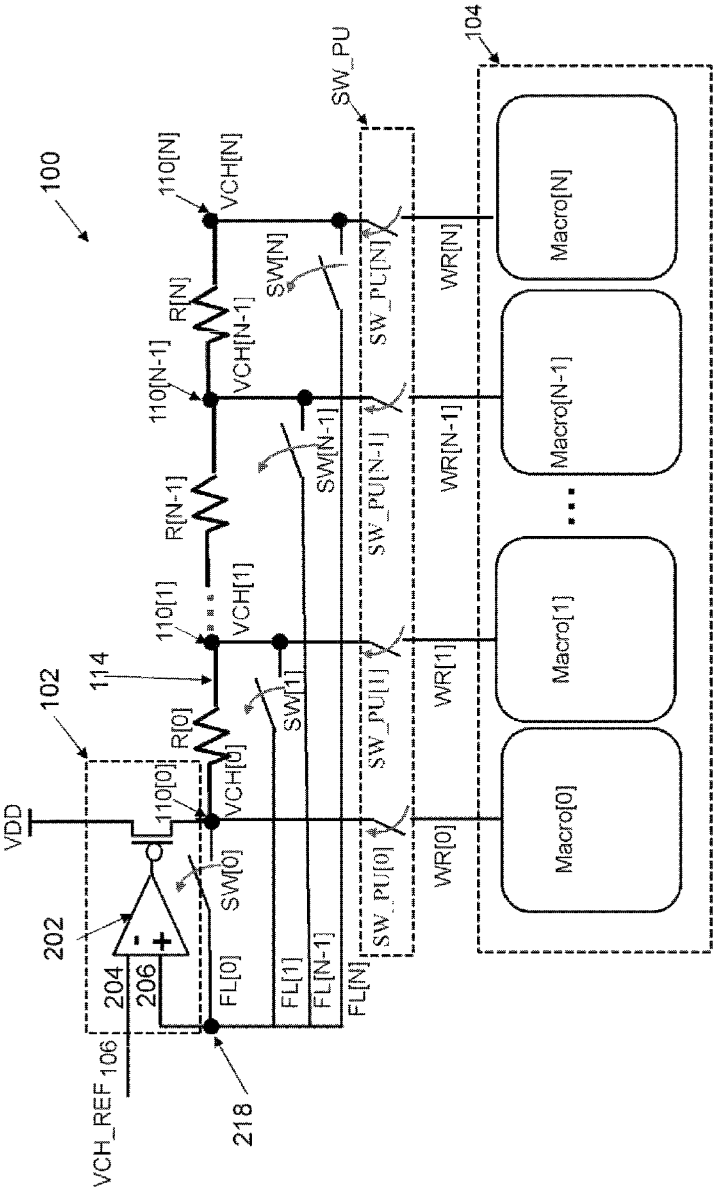
FIG. 3 is a diagram generally illustrating an example LDO voltage regulator circuit with a plurality of macros connected to a plurality of connection nodes along a connector in accordance with some embodiments.

FIG. 3 is a diagram generally illustrating another example LDO voltage regulator circuit 100 which includes a plurality of macros at a plurality of connection nodes in accordance with some embodiments. As shown in FIG. 3, LDO voltage regulator circuit 100 includes LDO voltage regulator 102 operative to provide a stable supply voltage to load 104.

Load 104 may include a plurality of macros. For example, load 104 includes a first Macro[0], a second Macro[1], continuing to a $(n-1)^{th}$ Macro[N−1], and a $n^{th}$ Macro[N]. Each of the plurality of macros is connectable to one of a plurality of connection nodes of LDO voltage regulator circuit 100. LDO voltage regulator 102 is configured to provide a stable supply voltage to each of the plurality of macros. For example, load 104 includes a memory device, and LDO voltage regulator 102 is configured to provide the supply voltage when the memory device is accessed, e.g., read or written to, by a user. When the memory device (i.e., load 104) is accessed, LDO voltage regulator 102 may generate a voltage for a word line of the memory device to read out a data bit from memory cells of the memory device. Further, according to some embodiments, LDO voltage regulator circuit 100 is also activated to provide the source current Is.

For example, and as shown in FIG. 3, LDO voltage regulator circuit 100 includes a plurality of connection nodes, that is, a first connection node 110[0], a second connection node 110[1], continuing to a (n−1)$^{th}$ connection node 110[N−1], and a n$^{th}$ connection node 110[N]. The plurality of connection nodes are located on connector 114 associated with output terminal 108 of LDO voltage regulator 102. In some examples, the plurality of connection nodes may be equally spaced on the connector. Although, the plurality of connection nodes are shown to be located on one connector 114 which is connected to output terminal 108 of LDO voltage regulator 102, it will be apparent to a person with ordinary skill in the art after reading this disclosure that the plurality of connection nodes may be located on more than one connectors connected to output terminal 108 of LDO voltage regulator 102.

A length of connector 114 between consecutive connection nodes is represented by a resistor. For example, a length of connector 114 between first connection node 110[0] and second connection node 110[1] is represented by first resistor R[0] continuing to a length of connector 114 between (n−2)$^{th}$ connection node (not shown) and (n−1)$^{th}$ connection node 110[N−1] being represented by (n−1)$^{th}$ resistor R[N−1]. Finally, a length of connector 114 between (n−1)$^{th}$ connection node 110(N−1) and n$^{th}$ connection node 110[N] is represented by n$^{th}$ resistor R[N].

In example embodiments, the plurality of macros are connectable to a corresponding connection node of the plurality of connection nodes of LDO voltage regulator circuit 100 through a corresponding load switch. For example, as shown in FIG. 3, LDO voltage regulator circuit 100 includes a plurality of load switches SW_PUs, for example, a first load switch SU PU[0], a second load switch SW_PU[1], continuing to a (n−1)$^{th}$ load switch SW_PU [N−1], and a n$^{th}$ load switch SW_PU [N]. First Macro[0] is connectable to first connection node 110[0] though first load switch SW_PU[0]. Similarly, second Macro[1] is connectable to second connection node 110[1] through second load switch SW_PU[1], continuing to (n−1)$^{th}$ Macro[N−1] which is connectable to (n−1)$^{th}$ connection node through (n−1)$^{th}$ load switch SW_PU[N−1]. Finally, n$^{th}$ Macro[N] is connectable to n$^{th}$ connection node 110[N] through n$^{th}$ load switch SW_PU[N]. In example embodiments, the plurality of load switches SW_PUs can be transistors, for example, a PMOS transistor, an NMOS transistor, etc. However, other types of switches are within scope of the disclosure.

In examples, a load switch SW_PU is switched-on to connect a corresponding macro to a corresponding connection node and is switched-off to disconnect the corresponding macro from the corresponding connection node. For example, first load switch SW_PU[0] is switched-on to connect first Macro[ ] to first connection node 110[0]. Moreover, first load switch SW_PU[0] is switched-off to dis-connect first Macro[ ] from first connection node 110[0]. Similarly, second load switch SW_PU[1] is switched-on to connect second Macro[1] to second connection node 110[1] and is switched-off to dis-connect second Macro[ ] from second connection node 110[1]. Continuing to, (n−1)$^{th}$ load switch SW_PU[N−1] which is switched-on to connect (n−1)$^{th}$ Macro[N−1] to (n−1)$^{th}$ connection node 110[N−1] and is switched-off to dis-connect (n−1)$^{th}$ Macro[N−1] from (n−1)$^{th}$ connection node 110[N−1]. Finally, n$^{th}$ load switch SW_PU[N] which is switched-on to connect n$^{th}$ Macro[N] to n$^{th}$ connection node 110[N] and is switched-off to dis-connect n$^{th}$ Macro[N] from n$^{th}$ connection node 110[N].

In example embodiments, each of the plurality connection nodes of LDO voltage regulator circuit 100 are connectable to a feedback node 218 via a plurality of feedback loops and a plurality of feedback switches of feedback circuit 112. For example, feedback circuit 112 includes a first feedback loop FL[0], a second feedback loop FL[1], continuing to a (n−1)$^{th}$ feedback loop FL[N−1], and a n$^{th}$ feedback loop FL[N]. In addition, feedback circuit 112 includes a first feedback switch SW[0], a second feedback switch SW[1], continuing to a (n−1)$^{th}$ feedback switch SW[N−1], and a n$^{th}$ feedback switch SW[N]. In example embodiments, the plurality of feedback switches can be transistors, for example, a PMOS transistor, an NMOS transistor, etc. However, other types of switches are within scope of the disclosure.

First connection node 110[0] is connectable to feedback node 218 though first feedback loop FL[0] and first feedback switch SW[0]. Similarly, second connection node 110[1] is connectable to feedback node 218 through first feedback loop FL[1] and second feedback switch SW_PU[1], continuing to (n−1)$^{th}$ connection node 110[N−1] which is connectable to feedback node 218 through (n−1)$^{th}$ feedback loop FL[N−1] and (n−1)$^{th}$ feedback switch SW[N−1], and n$^{th}$ connection node 110[N] being connectable to feedback node 218 via n$^{th}$ feedback loop FL[N] and n$^{th}$ feedback switch SW[N].

In examples, one of the plurality of feedback switches SWs is switched-on to connect a corresponding connection node to feedback node 218 through a corresponding feedback loop and is switched-off to disconnect a connection node from feedback node 218. For example, first feedback switch SW[0] is switched-on to connect first connection node 110[0] to feedback node 218 and is switched-off to disconnect first connection node 110[0] from feedback node 218 through first feedback loop FL[0]. Similarly, second feedback switch SW[1] is switched-on to connect second connection node 110[1] to feedback node 218 and is switched-off to disconnect second connection node 110[1] from feedback node 218 through second feedback loop FL[1]. Continuing to, (n−1)$^{th}$ feedback switch SW[N−1] which is switched-on to connect (n−1)$^{th}$ connection node 110[N−1] to feedback node 218 and is switched-off to dis-connect (n−1)$^{th}$ connection node 110[N−1] from feedback node 218 through (n−1)$^{th}$ feedback loop FL[N−1]. Finally, n$^{th}$ feedback switch SW[N] which is switched-on to connect n$^{th}$ connection node 110[N] to feedback node 218 and is switched-off to dis-connect n$^{th}$ connection node 110 [N] from feedback node 218 through n$^{th}$ feedback loop FL[N].

When connected, each of the plurality of feedback loops is configured to provide an instantaneous voltage of a corresponding connection node to second input terminal 206 of amplifier 202. For example, feedback node 218 is connected to second input terminal 206 of amplifier 202. So, when connected to first connection node 110[0], a first feedback loop FL[0] is configured to provide first instantaneous voltage VCH[ ] of first connection node 110[0] to second terminal 206 of amplifier 202. Similarly, when connected to second connection node 110[1], second feedback loop FL[1] is configured to provide a second instantaneous voltage VCH[ ] of second connection node 110[1] to second terminal 206 of amplifier 202. This continues to (n−1)$^{th}$ feedback loop FL[N−1] which when connected to $(n-1)^{th}$ connection node 110[N−1] provides a $(n-1)^{th}$ instantaneous voltage VCH[N−1] of $(n-1)^{th}$ connection node 110[N−1] to second terminal 206 of amplifier 202. Finally, $n^{th}$ feedback loop FL[N] when connected to $n^{th}$ connection node 110[N] provides a $n^{th}$ instantaneous voltage VCH[N] of $n^{th}$ connection node 110[N] to second terminal 206 of amplifier 202.

In example embodiments, LDO voltage regulator 102 is operative to provide a predetermined supply voltage to each of the plurality of macros. For example, LDO voltage regulator 102 is operative to provide a first write voltage WR[0] to first Macro[0], a second write voltage WR[1] to second Macro[1], continuing to $(n-1)^{th}$ voltage WR[N−1] to $(n-1)^{th}$ Macro[N−1], and $n^{th}$ write voltage WR[N] to $n^{th}$ Macro[N]. In example embodiments, each of the plurality of write voltages is substantially same or approximately equal to one another. That is, first write voltage WR[0] is substantially same as (or approximately equal to) second write voltage WR[1] which in turn is approximately equal to $(n-1)^{th}$ write voltage WR[N−1], which is approximately equal to $n^{th}$ write voltage WR[N].

In example embodiments, LDO voltage regulator 102 is configured to adjust the instantaneous voltage of the plurality of connection nodes based on the received feedback to maintain a voltage level at each of the plurality of connection nodes substantially or approximately equal to a corresponding write voltage level. For example, LDO voltage regulator 102 is operative to maintain a voltage level of first connection node 110[0] approximately equal to first write voltage WR[0]. Similarly, LDO voltage regulator 102 is operative to maintain a voltage level of second connection node 110[1] approximately equal to second write voltage WR[1], continuing to $(n-1)^{th}$ connection node 110[N−1] which is to be maintained at $(n-1)^{th}$ write voltage WR[N−1], and $n^{th}$ connection node 110[N] which is to be maintained at $n^{th}$ write voltage WR[N].

For example, amplifier 202 is operative to compare the instantaneous voltage with the input voltage VCH_REF, and current source 212 is operative to provide a predetermined source current Is to regulate the voltage level at the plurality of connection nodes. That is, amplifier 202, based on a difference between the instantaneous voltage and the input voltage VCH_REF, is operative to increase or decrease the source current Is to increase or decrease the instantaneous voltage at one or more of the plurality of connection nodes.

In example embodiments, although the plurality of feedback loops are shown to be connected between the plurality of connection nodes and the plurality of load switches, it will be apparent to a person with ordinary skill in the art after reading this disclosure that the plurality of feedback loops can also be connected between the plurality of load switches and the plurality of macros instead of being connected between the plurality of connection nodes and the plurality of load switches. Moreover, although the plurality of feedback loops are shown to be connectable to the plurality of connection nodes through a plurality of feedback switches, it will be apparent to a person with ordinary skill in the art after reading this disclosure that the plurality of feedback loops can be connectable to the plurality of connection nodes via the plurality of load switches thereby obviating the need for the plurality of feedback switches.

Figure 4:
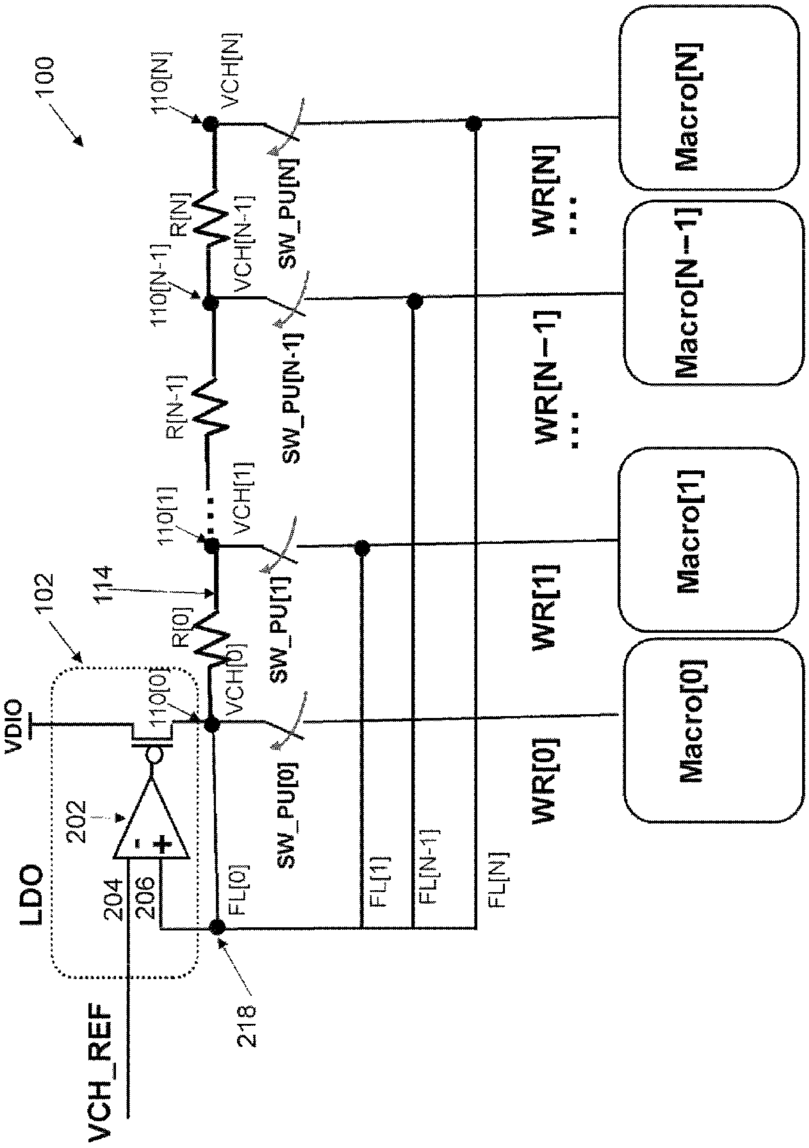
FIG. 4 is a diagram generally illustrating another example LDO voltage regulator circuit with a plurality of macros connected to a plurality of connection nodes along a connector in accordance with some embodiments.

For example, FIG. 4 illustrates an example LDO voltage regulator circuit 100 minus feedback switches in accordance with some embodiments. As shown FIG. 4, the plurality of loops are connectable to the plurality of connection nodes through the plurality of load switches SW_PUs. For example, first feedback loop FL[0] is connectable to first connection node 110[0] through first load switch SW_PU[0]. Similarly, second feedback loop FL[1] is connectable to second connection node SW_PU[1] through second load switch SW_PU[1], continuing to $(n-1)^{th}$ feedback loop FL[N−1] which is connectable to (n−1)th connection node 110[$n$−1] through $(n-1)^{th}$ load switch SW_PU[N−1], and $n^{th}$ feedback loop FL[N] being connectable to $n^{th}$ connection node 110[N] through $n^{th}$ load switch SW_PU[N].

In examples, a load switch SW_PU is switched-on to connect both a corresponding macro and a corresponding feedback loop to a corresponding connection node and is switched-off to disconnect both the corresponding macro and the corresponding feedback loop from the corresponding connection node. For example, first load switch SW_PU[0] is switched-on to connect first Macro[0] and first feedback loop FL[0] to first connection node 110[0]. Moreover, first load switch SW_PU[0] is switched-off to dis-connect first Macro[0] and first feedback loop FL[0] from first connection node 110[0]. Similarly, second load switch SW_PU[1] is switched-on to connect second Macro[1] and second feedback loop FL[1] to second connection node 110[1] and is switched-off to dis-connect second Macro[1] and second feedback loop FL[1] from second connection node 110[1], and so forth.

Figure 5:
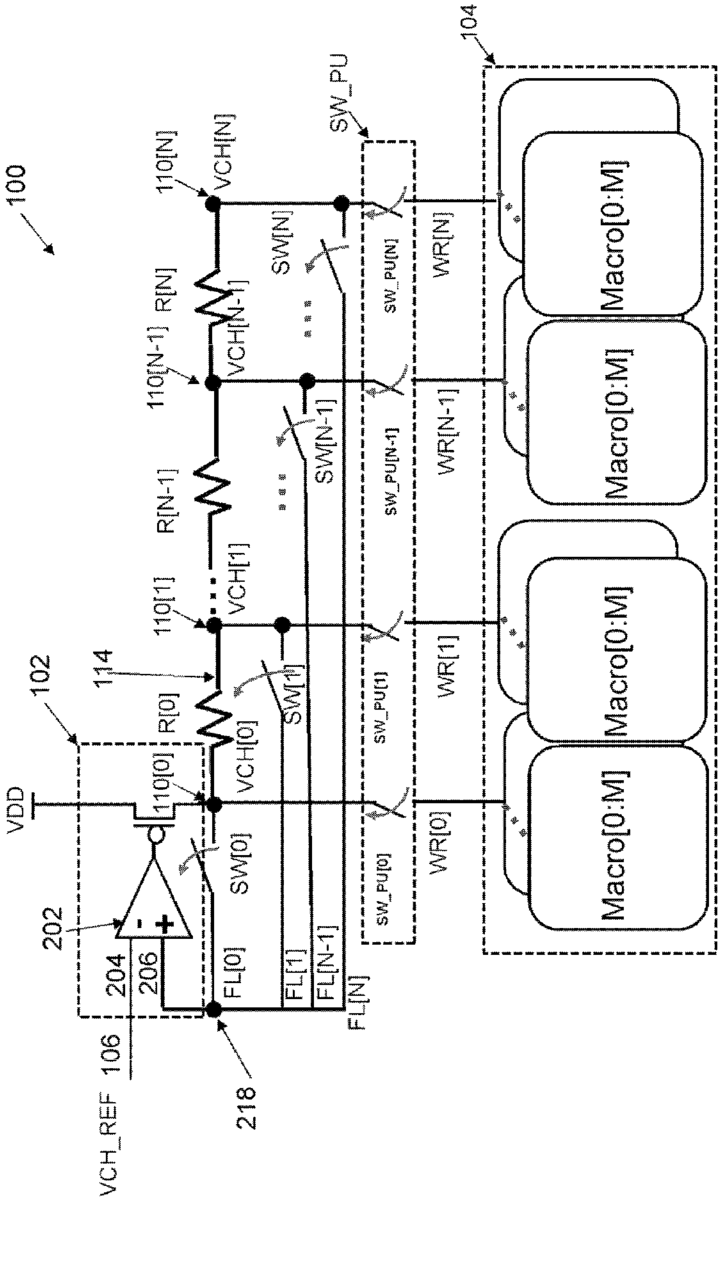
FIG. 5 is a diagram generally illustrating an example LDO voltage regulator circuit with multiple macros connected at each of a plurality of connection points along a connector in accordance with some embodiments.

In examples, multiple macros can be connected to each of the plurality of connection nodes of LDO voltage regulator circuit 100. For example, a predetermined number of macros can be connected to each of the plurality of connection nodes. FIG. 5 is a diagram generally illustrating an example LDO voltage regulator circuit 100 with multiple macros connected at each of the plurality of connection nodes in accordance with some embodiments. For example, and shown in FIG. 5, Macros[0:M] are connected to each of first connection node 110[0], second connection node 110[1], continuing to $(n-1)^{th}$ connection node 110[N−1], and $n^{th}$ connection node 110[N]. Although each of the plurality of connection nodes of LDO voltage regulator circuit 100 of FIG. 5 is shown to include a same number of macros (that is, M macros), it will be apparent to person with ordinary skill in the art after reading this disclosure that a different number of macros can be connected to one or more of the plurality of connection nodes.

Figure 6:
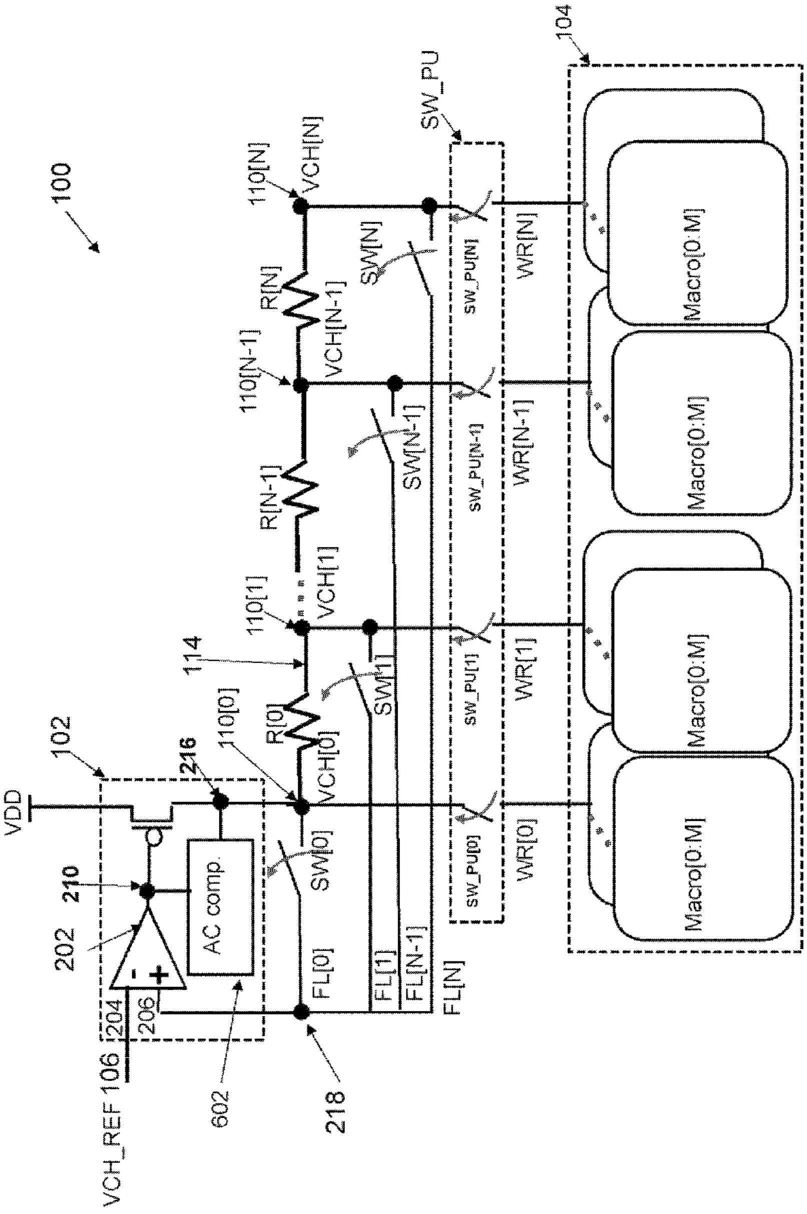
FIG. 6 is a diagram generally illustrating an example LDO voltage regulator circuit with an AC compensation circuit in accordance with some embodiments.

In some examples, an alternative current (AC) compensation circuit can be provided in LDO voltage regulator circuit 100. FIG. 6 illustrates an example LDO voltage regulator circuit 100 with an AC compensation circuit 602 (also referred to as a frequency compensation circuit 602). In example embodiments, AC compensation circuit 602 is connected in series with LDO voltage regulator 102. For example, and as shown in FIG. 6, AC compensation circuit 602 is connected between first internal node 210 and second internal node 216. AC compensation circuit 602 is configured to avoid an unintentional creation of positive feedback which may cause amplifier 202 of LDO voltage regulator 102 to oscillate. In addition, AC compensation circuit 602 is configured to control an overshoot and ringing in amplifier's 202 response. An example AC compensation circuit 602 is discussed in greater detail with reference to FIG. 7.

Figure 7:
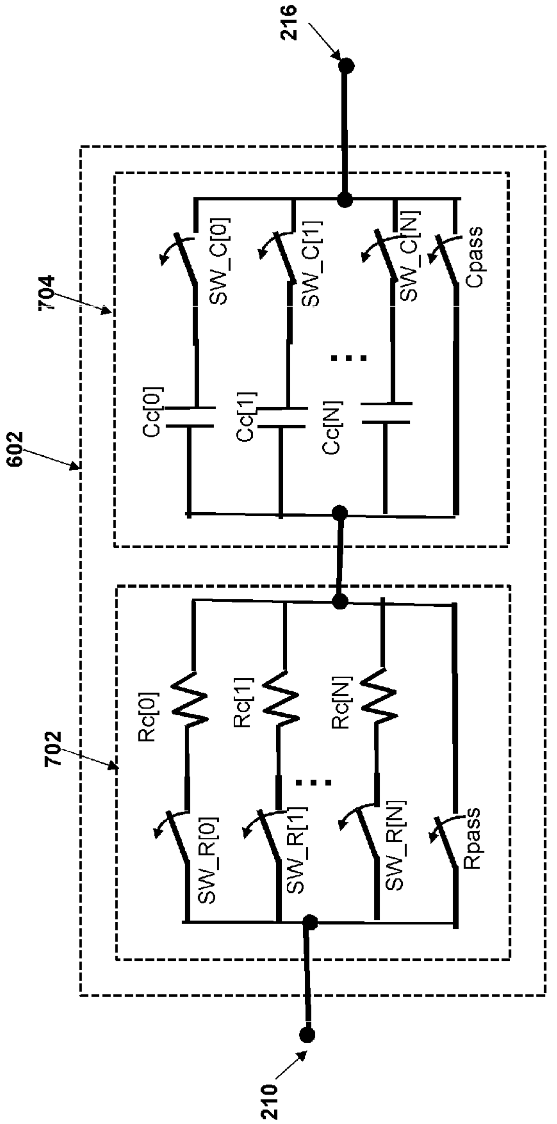
FIG. 7 is a diagram generally illustrating an example AC compensation circuit in accordance with some embodiments.

FIG. 7 illustrates an example AC compensation circuit 602 in accordance with some embodiments of the disclosure. As shown in FIG. 7, AC compensation circuit 602 comprises a RC circuit having a trimmable register bank and a trimmable capacitor bank. For example, and as shown in FIG. 7, AC compensation circuit 602 includes a register bank 702 and a capacitor bank 704. Register bank 702 is connected in series with capacitor bank 704.

Register bank 702 includes a plurality of connectable resistors and a plurality of switches to connect or disconnect one or more of the plurality of connectable registers. For example, register bank 702 comprises a first connectable resistor Rc[0] and a first switch SW_R[0] to connect and disconnect first connectable resistor Rc[0] from the RC circuit, a second connectable resistor Rc[1] and a second switch SW_R[1] to connect and disconnect second connectable resistor Rc[1] from the RC circuit, continuing to a $n^{th}$ connectable resistor Rc[N] and a $n^{th}$ switch SW_R[N] to connect and disconnect $n^{th}$ connectable resistor Rc[N] from the RC circuit. In addition, register bank 702 includes a bypass switch Rpass to bypass register bank 702. For example, when switched-on, the bypass switch Rpass provides a direct path thereby bypassing the plurality of resistors of register bank 702.

In example embodiments, register bank 702 is trimmable and a desired resistance value for register bank 702 is selected by connecting or disconnecting one or more of the plurality of connectable registers of register bank 702. For example, first switch SW_R[0] is switched-on to connect first connectable resistor Rc[0] to the RC circuit and is switched-off to disconnect first connectable resistor Rc[0] from the RC circuit. In example embodiments, a number of connectable resistors connected to the RC circuit is dependent on load 104 of LDO voltage regulator circuit 100. For example, the number of connectable resistors connected to the RC circuit is dependent on a number of macros in load 104 of LDO voltage regulator circuit 100. In example embodiments, the plurality of switches of resistor bank 702 can be transistors, for example, a PMOS transistor, an NMOS transistor, etc. However, other types of switches are within scope of the disclosure.

Capacitor bank 704 comprises a plurality of connectable capacitors and a plurality of switches to connect or disconnect one or more of the plurality of connectable capacitors. For example, capacitor bank 704 comprises a first connectable capacitor Cc[0] and a first switch SW_C[0] to connect and disconnect the first connectable capacitor Cc[0] from the RC circuit, a second connectable capacitor Cc[1] and a second switch SW_C[1] to connect and disconnect the second connectable capacitor Cc[1] from the RC circuit, continuing to a $n^{th}$ connectable capacitor Cc[N] and a $n^{th}$ switch SW_C[N] to connect and disconnect the $n^{th}$ connectable capacitor Cc[N] from the RC circuit. In addition, capacitor bank 704 includes a bypass switch Cpass to bypass capacitor bank 704. For example, when switched-on, the bypass switch Cpass provides a direct path thereby bypassing the plurality of capacitors of capacitor bank 702.

In example embodiments, capacitor bank 704 is trimmable and a desired capacitance value for capacitor bank 704 is selected by connecting or disconnecting one or more of the plurality of connectable capacitors of capacitor bank 704. For example, first switch SW_C[0] is switched-on to connect first connectable capacitor Cc[0] to the RC circuit and is switched-off to disconnect first connectable capacitor Cc[0] from the RC circuit. In example embodiments, a number of connectable capacitors connected to the RC circuit is dependent on load 104 of LDO voltage regulator circuit 100. For example, the number of connectable capacitors connected to the RC circuit is dependent on a number of macros in load 104 of LDO voltage regulator circuit 100. In example embodiments, the plurality of switches of capacitor bank 704 can be transistors, for example, a PMOS transistor, an NMOS transistor, etc. However, other types of switches are within scope of the disclosure.

Figure 8:
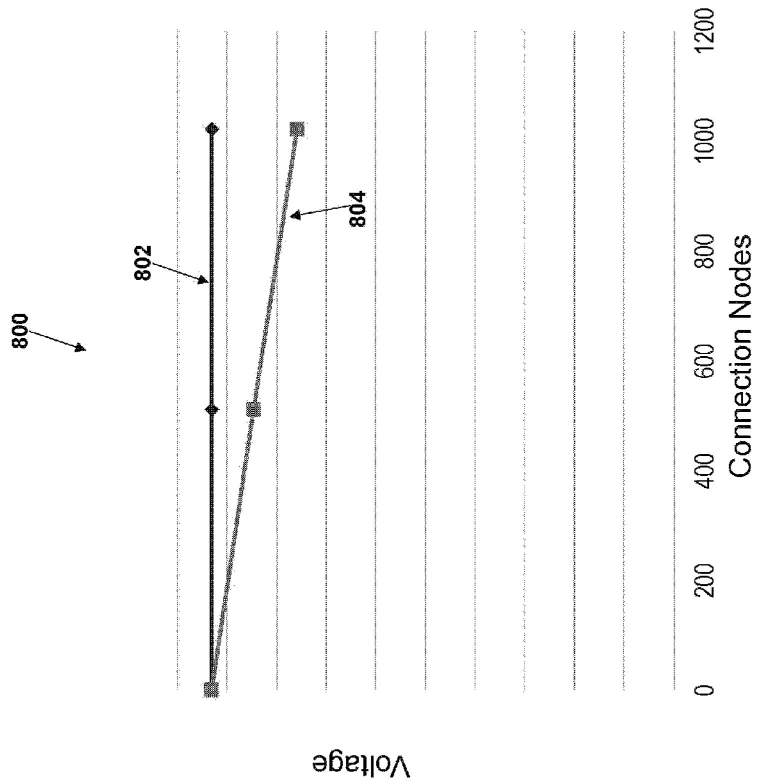
FIG. 8 is a diagram generally illustrating voltage levels at a plurality of connection nodes along a connector of LDO voltage regulator circuit in accordance with some embodiments.

FIG. 8 is a diagram 800 generally illustrating example voltages at connection nodes along a connector of LDO voltage regulator circuit 100 in accordance with some embodiments. First plot 802 of FIG. 8 illustrates a plot of voltages at the plurality of connection nodes along a connector of LDO voltage regulator circuit 100 and second plot 804 of FIG. 8 illustrates a plot of voltages at the plurality of connection nodes along a connector of a conventional regulator circuit. As shown by first plot 802, the voltage at the plurality of connection nodes of LDO voltage regulator circuit 100 remains constant while with a number of connection nodes. However, and as shown by second plot 804, the voltage at the connection nodes of a conventional regulator circuit drops with an increasing connection nodes.

Figure 9:
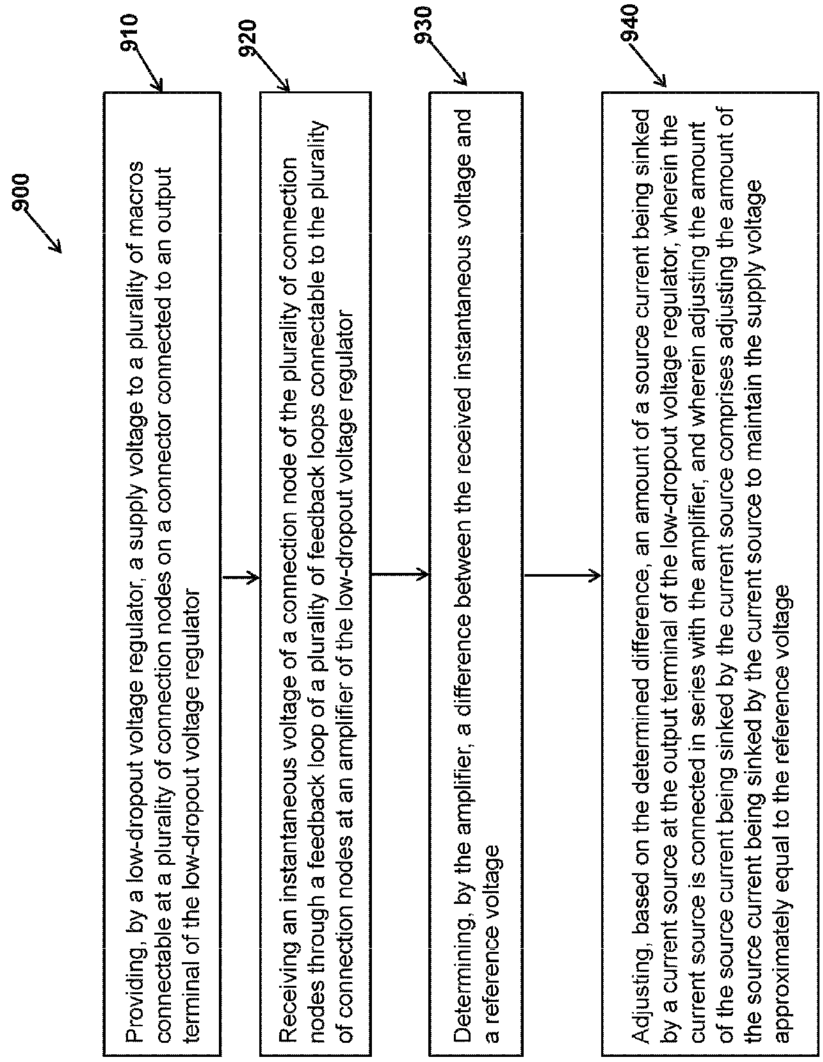
FIG. 9 is a flowchart of a method for providing a supply voltage to a plurality of macros in accordance with some embodiments.

FIG. 9 is a flow diagram illustrating a method 900 for providing a supply voltage in accordance with some embodiments. Method 900 may be implemented in LDO voltage regulator circuit 100 or a chip comprising LDO voltage regulator circuit 100. In addition, steps of method 900 may be stored as instructions which may be executed by a processor to implement method 900.

At block 910 of method 900, a supply voltage to a plurality of macros is provided by a low-dropout voltage regulator, for example, LDO voltage regulator 102. The plurality of macros are connectable at a plurality of connection nodes on a connector connected to an output terminal of the low-dropout voltage regulator. For example, a plurality of macros (that is, first Macro[0], . . . , $n^{th}$ Macro[N]) are connectable to a plurality of connection nodes (that is, first connection node 110[0], . . . , $n^{th}$ connection node [N]). LDO voltage regulator 102 is operative to provide a supply voltage to the plurality of macros.

At block 920 of method 900, an instantaneous voltage of a connection node of the plurality of connection is received through a feedback loop of a plurality of feedback loops. The plurality of feedback loops are connectable to the plurality of connection nodes. The instantaneous voltage is received at an amplifier of the low-dropout voltage regulator. For example, a plurality of feedback loops (that is, first feedback loop FL[0], . . . , $n^{th}$ feedback loop FL[N]) are connectable to the plurality of connection nodes (that is, first connection node 110[0], . . . , $n^{th}$ connection node [N]). The instantaneous voltage is received at amplifier 202 of LDO voltage regulator 102.

At block 930 of method 900, a difference between the received instantaneous voltage and a reference voltage is determined. In example embodiments, the difference between the received instantaneous voltage and a reference voltage is determined by amplifier 202. The received instantaneous voltage is provided at second input terminal 206 and the reference voltage is provided at first input terminal 204 of amplifier 202 which is operative to compare inputs and determine a difference between the inputs.

At block 940 of method 900, an amount of a source current being sinked by a current source at the output terminal of the low-dropout voltage regulator is adjusted based on the determined difference. For example, an amount of the source current being sinked by current source 212 at output terminal 108 of LDO voltage regulator 102 is adjusted based on the difference between the received instantaneous voltage of a connection node and the reference voltage. Current source 212 is connected in series with amplifier 202. Adjusting the amount of the source current being sinked by current source 212 includes adjusting the amount of the source current being sinked by current source 212 to maintain the supply voltage approximately equal to the reference voltage.

In accordance with some embodiments, a voltage regulator circuit comprises: a voltage regulator configured to provide an output voltage at an output terminal; a plurality of macros connectable at a plurality of connection nodes of a connector connected to the output terminal of the voltage regulator; and a feedback circuit comprising a plurality of feedback loops connectable to the plurality of connection nodes, wherein a feedback loop of the plurality of feedback loops, when connected to a connection node of the plurality of connection nodes, is configured to provide an instantaneous voltage of the connection node as a feedback to the voltage regulator, and wherein the voltage regulator is configured, in response to the instantaneous voltage, regulate the output voltage to maintain the instantaneous voltage of the connection node approximately equal to a reference voltage.

In some example embodiments, a voltage regulator circuit comprises: a voltage regulator configured to provide an output voltage at an output terminal; a connector connected to the output terminal, the connector comprising a plurality of connection nodes spaced along a length of the connector; a plurality of macros connectable at the plurality of connection nodes of the connector; and a plurality of feedback loops connectable at the plurality of connection nodes, wherein each of the plurality of feedback loops, when connected to a corresponding connection node of the plurality of connection nodes, is configured to provide an instantaneous voltage of the corresponding connection node as a feedback to the voltage regulator, and wherein the voltage regulator is configured, in response to the instantaneous voltage, regulate the output voltage to maintain the instantaneous voltage of the corresponding connection node approximately equal to a reference voltage.

In accordance with example embodiments, a method of providing a supply voltage comprises: providing, by a low-dropout voltage regulator, a supply voltage to a plurality of macros connectable at a plurality of connection nodes on a connector connected to an output terminal of the low-dropout voltage regulator; receiving an instantaneous voltage of a connection node of the plurality of connection nodes through a feedback loop of a plurality of feedback loops connectable to the plurality of connection nodes at an amplifier of the low-dropout voltage regulator; determining, by the amplifier, a difference between the received instantaneous voltage and a reference voltage; and adjusting, based on the determined difference, an amount of a source current being sinked by a current source at the output terminal of the low-dropout voltage regulator, wherein the current source is connected in series with the amplifier, and wherein adjusting the amount of the source current being sinked by the current source comprises adjusting the amount of the source current being sinked by the current source to maintain the supply voltage approximately equal to the reference voltage.

This disclosure outlines various embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A voltage regulator circuit, comprising:

a voltage regulator configured to provide an output voltage at an output terminal;

a connector connected to the output terminal of the voltage regulator, wherein the connector comprises a plurality of connection nodes spaced along a length of the connector;

a plurality of macros connectable at a plurality of connection nodes; and a plurality of feedback loops, each feedback loop of the plurality of feedback loops connectable between a connection node of the plurality of connection nodes through a feedback switch associated with the feedback loop and an input terminal of the voltage regulator, wherein the each feedback loop of the plurality of feedback loops, when connected to the connection node of the plurality of connection nodes, is configured to provide an instantaneous voltage of the connection node as a feedback to the voltage regulator, and wherein the voltage regulator is configured to, in response to receiving the instantaneous voltage, adjust an amount of a source current being sinked by a current source at the output terminal of the voltage regulator.

2. The voltage regulator circuit of claim 1, wherein the voltage regulator comprises an amplifier and a current source, wherein the amplifier comprises a first input terminal, a second input terminal, and an amplifier output terminal, wherein an input reference voltage is provided at the first input terminal and the instantaneous voltage is provided at the second input terminal, and wherein the amplifier output terminal is connected to the current source.

3. The voltage regulator circuit of claim 2, wherein the amplifier is configured to determine a difference between the input reference voltage and the instantaneous voltage and regulate a source current of the current source to minimize a difference between the instantaneous voltage and the reference voltage.

4. The voltage regulator circuit of claim 2, wherein the current source comprises a transistor, wherein a gate of the transistor is connected to the output terminal of the amplifier, wherein source/drain of the transistor is connected to a transistor supply voltage, and wherein drain/source is connected to the output node.

5. The voltage regulator circuit of claim 2, further comprising a compensation circuit coupled is series with the voltage regulator.

6. The voltage regulator circuit of claim 5, wherein the compensation circuit comprises a RC circuit.

7. The voltage regulator circuit of claim 6, wherein the RC circuit is trimmable.

8. The voltage regulator circuit of claim 6, wherein the RC circuit comprises a register bank comprising a plurality of resistors and a capacitor bank comprising a plurality of capacitors, the capacitor bank connected in series with the resistor bank.

9. The voltage regulator of claim 1, wherein multiple macros of the plurality of macros is connectable to each of the plurality of connection nodes.

10. A voltage regulator circuit, comprising:

a voltage regulator configured to provide an output voltage at an output terminal;

a connector connected to the output terminal, the connector comprising a plurality of connection nodes spaced along a length of the connector;

a plurality of macros connectable at the plurality of connection nodes; and a plurality of feedback loops connectable between the plurality of connection nodes spaced along the length of the conductor and an input terminal of the voltage regulator, wherein each of the plurality of feedback loops, when connected to a corresponding connection node of the plurality of connection nodes through a feedback switch, is configured to provide an instantaneous voltage of the corresponding connection node as a feedback to the voltage regulator, and wherein the voltage regulator is configured to, in response to the instantaneous voltage, regulate the output voltage to be equal to a reference voltage.

11. The voltage regulator circuit of claim 10, wherein the plurality of macros are connectable at the plurality of connection nodes through a plurality of load switches.

12. The voltage regulator circuit of claim 10, wherein the feedback switch corresponding to a selected feedback loop associated with a selected connection node is switched-on when a load switch of a selected macro connected to the selected connection node is switched-on.

13. The voltage regulator circuit of claim 10, wherein only one macro of the plurality of macros are connectable to each of the plurality of connection nodes.

14. The voltage regulator circuit of claim 10, wherein more than one macro of the plurality of macros are connectable to at least one connection node of the plurality of connection nodes.

15. The voltage regulator circuit of claim 10, further comprising a compensation circuit connected in series with the voltage regulator.

16. The voltage regulator of circuit of claim 15, wherein the compensation circuit comprises a RC circuit having a resistor bank connected in series with a capacitor bank, and wherein each of the resistor bank and the capacitor bank is trimmable.

17. A method of providing a supply voltage, the method comprising:

providing, by a voltage regulator, a supply voltage to a plurality of macros, wherein each one of the plurality of macros are connectable to one of a plurality of connection nodes spaced along a length of a connector connected to an output terminal of the voltage regulator;

receiving, by the voltage regulator, an instantaneous voltage of a connection node of the plurality of connection nodes through a feedback loop of a plurality of feedback loops, wherein each of the plurality of feedback loops are connectable between one of the plurality of connection nodes spaced along the length of the conductor and an input terminal of the voltage regulator through a feedback switch associated with each of the plurality of feedback loops;

determining, by the voltage regulator, a difference between the received instantaneous voltage and a reference voltage; and regulating, by the voltage regulator based on the determined difference, the supply voltage to be equal to the reference voltage.

18. The method of claim 17, further comprising providing the supply voltage to the plurality of macros connectable at the plurality of connection nodes comprises providing the supply voltage to the plurality of macros connectable at the plurality of connection nodes, wherein more than one macro of the plurality of macros are connectable at each of the plurality of connection nodes.

19. The method of claim 17, wherein the plurality of macros are connectable at the plurality of connection nodes through a plurality of load switches.

20. The method of claim 17, wherein the feedback switch corresponding to a selected feedback loop associated with a selected connection node is switched-on when a load switch of a selected macro connected to the selected connection node is switched-on.

* * * * *